(12) United States Patent
Roeland et al.

(10) Patent No.: US 9,967,791 B2
(45) Date of Patent: May 8, 2018

(54) METHODS AND DEVICES FOR CONDITIONAL ATTACHMENT TO A NETWORK

(71) Applicant: Telefonaktiebolaget L M Ericsson (PUBL), Stockholm (SE)

(72) Inventors: Dinand Roeland, Sollentuna (SE); Oumer Teyeb, Solna (SE)

(73) Assignee: TELEFONAKTIEBOLAGET L M ERICSSON (PUBL), Stockholm (SE)

(*) Notice: Subject to any disclaimer, the term of this patent is extended or adjusted under 35 U.S.C. 154(b) by 0 days. days.

(21) Appl. No.: 14/418,819

(22) PCT Filed: Dec. 29, 2014

(86) PCT No.: PCT/SE2014/051576
§ 371 (c)(1),
(2) Date: Jan. 30, 2015

(87) PCT Pub. No.: WO2015/115961
PCT Pub. Date: Aug. 6, 2015

(65) Prior Publication Data
US 2016/0037412 A1 Feb. 4, 2016

Related U.S. Application Data

(60) Provisional application No. 61/934,587, filed on Jan. 31, 2014.

(51) Int. Cl.
*H04W 4/00* (2018.01)
*H04W 36/14* (2009.01)
(Continued)

(52) U.S. Cl.
CPC ....... *H04W 36/14* (2013.01); *H04W 36/0055* (2013.01); *H04W 36/16* (2013.01);
(Continued)

(58) Field of Classification Search
CPC . H04W 80/04; H04W 36/18; H04W 36/0011; H04W 36/14; H04W 36/08
See application file for complete search history.

(56) References Cited

U.S. PATENT DOCUMENTS

2007/0025297 A1* 2/2007 Lee ................... H04W 36/0066
370/331
2010/0208604 A1* 8/2010 Kazmi ................. H04W 36/24
370/252
(Continued)

FOREIGN PATENT DOCUMENTS

EP 2317822 A1 5/2011
EP 2661125 A1 11/2013
(Continued)

OTHER PUBLICATIONS

Ericsson et al. "RAN controlled WLAN offloading" 3GPP TSG-RAN WG2 #83, Tdoc R2-132826, 2013, 7 pages.
(Continued)

*Primary Examiner* — Siren Wei
(74) *Attorney, Agent, or Firm* — Sage Patent Group (57) ABSTRACT

A method implemented in a user equipment (UE) for establishing reattachment to a first network includes establishing a data connection to a second network. The method further includes detecting a detachment from the first network. The method further includes entering a conditional state after detecting the detachment from the first network. After entering the conditional state, the method further includes monitoring one or more broadcast transmissions from a network node, extracting broadcast data included in the broadcast transmissions of the first network, applying the extracted broadcast data in a predetermined rule, and if the predetermined rule is satisfied, establishing the reattachment to the first network.

28 Claims, 10 Drawing Sheets

(51) Int. Cl.
*H04W 36/00* (2009.01)
*H04W 36/16* (2009.01)
*H04W 28/08* (2009.01)
*H04W 88/06* (2009.01)
*H04W 84/04* (2009.01)
*H04W 84/12* (2009.01)

(52) U.S. Cl.
CPC .......... *H04W 28/08* (2013.01); *H04W 84/042* (2013.01); *H04W 84/12* (2013.01); *H04W 88/06* (2013.01)

(56) References Cited

U.S. PATENT DOCUMENTS

| | | | | |
|---|---|---|---|---|
| 2011/0053588 | A1* | 3/2011 | Al-Khudairi | H04W 36/30 455/424 |
| 2012/0177002 | A1* | 7/2012 | Faucher | H04W 36/02 370/331 |
| 2012/0275371 | A1 | 11/2012 | Somasundaram et al. | |
| 2013/0034080 | A1* | 2/2013 | Yang | H04W 36/0005 370/331 |
| 2013/0083646 | A1* | 4/2013 | Hietalahti | H04W 76/06 370/216 |
| 2013/0171995 | A1* | 7/2013 | Fujishiro | H04W 28/08 455/441 |
| 2013/0208605 | A1* | 8/2013 | Bautista | H04W 36/14 370/252 |
| 2013/0308445 | A1* | 11/2013 | Xiang | H04W 28/0231 370/230 |
| 2013/0329631 | A1* | 12/2013 | Alam | H04W 52/362 370/328 |
| 2015/0085650 | A1* | 3/2015 | Cui | H04W 92/02 370/230 |

FOREIGN PATENT DOCUMENTS

| | | |
|---|---|---|
| WO | 2012147270 A1 | 11/2012 |
| WO | 2013164247 A2 | 11/2013 |

OTHER PUBLICATIONS

Ericsson et al. "Way forward for WLAN/3GPP Radio Interworking" 3GPP TSG-RAN WG2 #83, Tdoc R2-132827, 2013, 8 pages.
3GPP, 3rd Generation Partnership Project; Technical Specification Group Radio Access Network; Study on Wireless Local Area Network (WLAN)—3GPP radio interworking (Release 12), 3GPP TR 37.834 V12.0.0, 2013, 17 pages.
3GPP, 3rd Generation Partnership Project; Technical Specification Group Radio Access Network; Evolved Universal Terrestrial Radio Access (E-UTRA); Radio Resource Control (RRC); Protocol specification (Release 12), 3GPP TS 36.331 V12.0.0, 2013, 349 pages.
3GPP, 3rd Generation Partnership Project; Technical Specification Group Core Network and Terminals; Non-Access-Stratum (NAS) protocol for Evolved Packet System (EPS); Stage 3 (Release 12), 3GPP TS 24.301 V12.3.0, 2013, 353 pages.
3GPP, 3rd Generation Partnership Project; Technical Specification Group Services and System Aspects; Architecture enhancements for non-3GPP accesses (Release 12), 3GPP TS 23.402 V12.3.0, 2013, 288 pages.
3GPP, 3rd Generation Partnership Project; Technical Specification Group Services and System Aspects; General Packet Radio Service (GPRS) enhancements for Evolved Universal Terrestrial Radio Access Network (E-UTRAN) access (Release 12), 3GPP TS 23.401 V12.3.0, 2013, 302 pages.
Supplemental European Search Report dated Dec. 21, 2016, issued in European Patent Application No. 14881144.1, 4 pages.
European Office Action issued in Application No. 14 881 144.1 dated Jan. 27, 2017, 9 pages.

* cited by examiner

PRIOR ART

METHODS AND DEVICES FOR CONDITIONAL ATTACHMENT TO A NETWORK

CROSS REFERENCE TO RELATED APPLICATION(S)

This application is a 35 U.S.C. § 371 National Phase Entry Application from PCT/SE2014/051576, filed Dec. 29, 2014, designating the United States and also claims the benefit of priority under 35 U.S.C. § 119(e) to provisional application 61/934,587 titled "Methods and Devices for Conditional Attachment to a Network," filed on Jan. 31, 2014. The disclosures of both applications, are incorporated herein in their entirety by reference.

TECHNICAL FIELD

This disclosure relates generally to methods and devices for conditional attachment to a network and, more particularly, reattaching to a Long Term Evolution (LTE) network after detachment.

BACKGROUND

A concept in 3GPP Evolved Packet Core (EPC) architecture is a "Packet Data Network" (PDN). A PDN is an IP network, which is typically, for example, the Internet, but it can also be a closed corporate network or an operator service network, like IMS. A PDN has one or more names, each name represented in a string called an Access Point Name (APN). A PDN gateway (PDN-GW or PGW) is a functional node that provides access to one or more PDNs.

Figure 1:
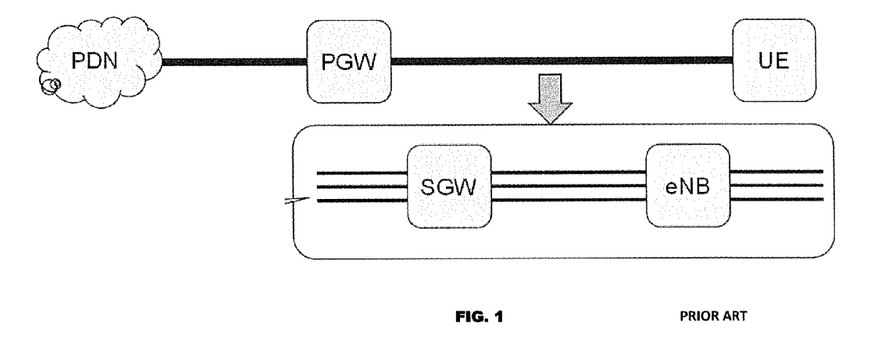
FIG. 1 is an illustration of a PDN connection and EPS bearer.

As illustrated in FIG. 1, a PDN connection provides a User Equipment (UE) with an access channel to a PDN. The PDN connection is a logical IP tunnel between the UE and PGW. Each PDN connection has a single IP address/prefix. A UE can setup multiple PDN connections, possibly to the same APN. Each PDN connection contains one or more EPS Bearers, where each bearer is defined by a set of IP packet filters and a QoS profile. Each EPS bearer runs end-to-end between UE and PDN GW and is a concatenation of an S5 GTP tunnel (PGW-SGW), an S1 GTP tunnel (SGW-eNB), and a radio bearer (eNB-UE).

Figure 2:
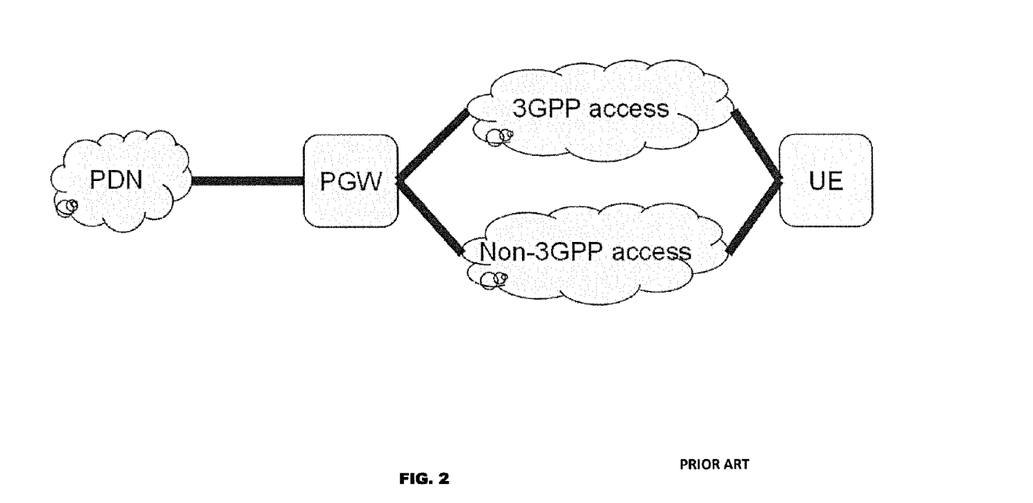
FIG. 2 is an illustration of a network topology with 3GPP access and non-3GPP access.

FIG. 1 further illustrates an EPC network with LTE as radio access network. This type of access is also called a "3GPP access" because the radio access technology is defined by 3GPP. A non-3GPP access is a radio access network based on a radio technology not defined by 3GPP (e.g., CDMA200 or WLAN). A PDN connection can be setup over a 3GPP access or over a non-3GPP access. FIG. 2 illustrates these concepts. Integration of WLAN as non-3GPP access with the 3GPP Evolved Packet Core (EPC) is specified in 3GPP TS 23.402 section 16.

The UE may connect to the mobile core network and the PDN via a non-3GPP access. If such non-3GPP access is a WLAN, then the UE needs to select a WLAN access point (AP). Also, if the UE is connected to both the 3GPP access and the WLAN access, a method is needed to decide which part of the user-plane traffic to route over which access.

Conventionally, two basic methods are available. In a first method, AP selection and traffic steering is controlled by operator policies received in the UE from the Access Network Discovery and Selection Function (ANDSF). ANDSF is defined and described in 3GPP TS 23.402 section 4.8. ANDSF is a core network function that is accesses by the UE over an IP-based interface (S14). In a second method, AP selection and traffic steering is controlled from the 3GPP radio access network (RAN).

A basic design principle in LTE is that a UE connected to an EPC via LTE always has an IP connection (i.e., a UE always has at least one PDN connection). If the last PDN connection gets disconnected from a LTE network (e.g., because of a handover from LTE to WLAN), then the UE gets disconnected from the LTE network. Upon a handover of a PDN connection to a WLAN, if the PDN connection is routed to an EPC via WLAN, the UE continues using the PGW in the EPC, but if the last PDN connection was handed over from the LTE network to the WLAN, the UE is disconnected from the LTE network.

In RAN-based network selection and traffic steering, the control signaling goes over the LTE network or any other network compatible with the UE (e.g., 2G, 3G, etc.). If the UE gets disconnected from the LTE (e.g., because RAN steers all traffic for that UE to the WLAN, and all EPS bearers and consequently all PDN connections are moved to WLAN), then subsequent control signaling cannot reach the UE anymore. This is a problem in RAN-based traffic steering.

One solution to this problem is to ensure that there always stays at least one PDN connection over the LTE network (e.g., the PDN connection for IMS voice always stays on the LTE network, while the PDN connection for Internet data traffic can move between the LTE network and WLAN). However, this solution may not always be possible. A common solution may be that the UE only has a single PDN connection carrying all types of traffic. In order to stay connected to the LTE network, even in the case the single PDN Connection is moved to the WLAN, a solution could be to setup a "dummy PDN connection" to the LTE network. Several alternatives exist on when to setup the dummy PDN connection. This could, for example, be done when the UE first connects to LTE, where the dummy PDN connection is never released, or when the UE sets up the dummy PDN connection just before the ordinary PDN connection is handed over to the WLAN. The dummy PDN Connection can then be released when the ordinary PDN connection has returned to the LTE network.

Having a dummy connection is not preferred, for a number of reasons. First, the dummy connection generates control signaling upon initial setup and upon intra-LTE handover. Second, the dummy connection takes resources in the involved network nodes (e.g., memory state).

SUMMARY

According to some embodiments, a method implemented in a user equipment (UE) for establishing reattachment to a first network includes establishing a data connection to a second network. The method further includes detecting a detachment from the first network. The method further includes entering a conditional state after detecting the detachment from the first network. After entering the conditional state, the method further includes monitoring one or more broadcast transmissions from a network node, extracting broadcast data included in the broadcast transmissions of the first network, applying the extracted broadcast data in a predetermined rule, and if the predetermined rule is satisfied, establishing the reattachment to the first network.

In some embodiments, a method implemented in a network node operable in a first network includes identifying at least one User Equipment (UE) registered on the first network. The method further includes retrieving network information associated with the at least one UE. The method further includes setting a scaling factor for the at least one UE in accordance with the retrieved network information. The method also includes providing the scaling factor to the UE, wherein the UE scales a threshold associated with a predetermined rule that determines whether the UE re-attaches to the first network.

According to some embodiments, a user equipment (UE) for establishing reattachment to a first network includes a processor and a memory coupled to the processor. The processor is configured to establish a data connection to a second network, detect a detachment from the first network, and enter a conditional state after detecting the detachment from the first network. After entering the conditional state, the processor is configured to monitor one or more broadcast transmissions from a network node, extract broadcast data included in the broadcast transmissions of the first network, apply the extracted broadcast data in a predetermined rule, and if the predetermined rule is satisfied, establish the reattachment to the first network.

In some embodiments, a network node operable in a first network includes a processor and a memory coupled to the processor. The processor is configured to identify at least one User Equipment (UE) registered on the first network. The processor is further configured to retrieve network information associated with the at least one UE. The processor is further configured to set a scaling factor for the at least one UE in accordance with the retrieved network information. The process is also configured to provide the scaling factor to the UE, wherein the UE scales a threshold associated with a predetermined rule that determines whether the UE re-attaches to the first network.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements.

DETAILED DESCRIPTION

Figure 3:
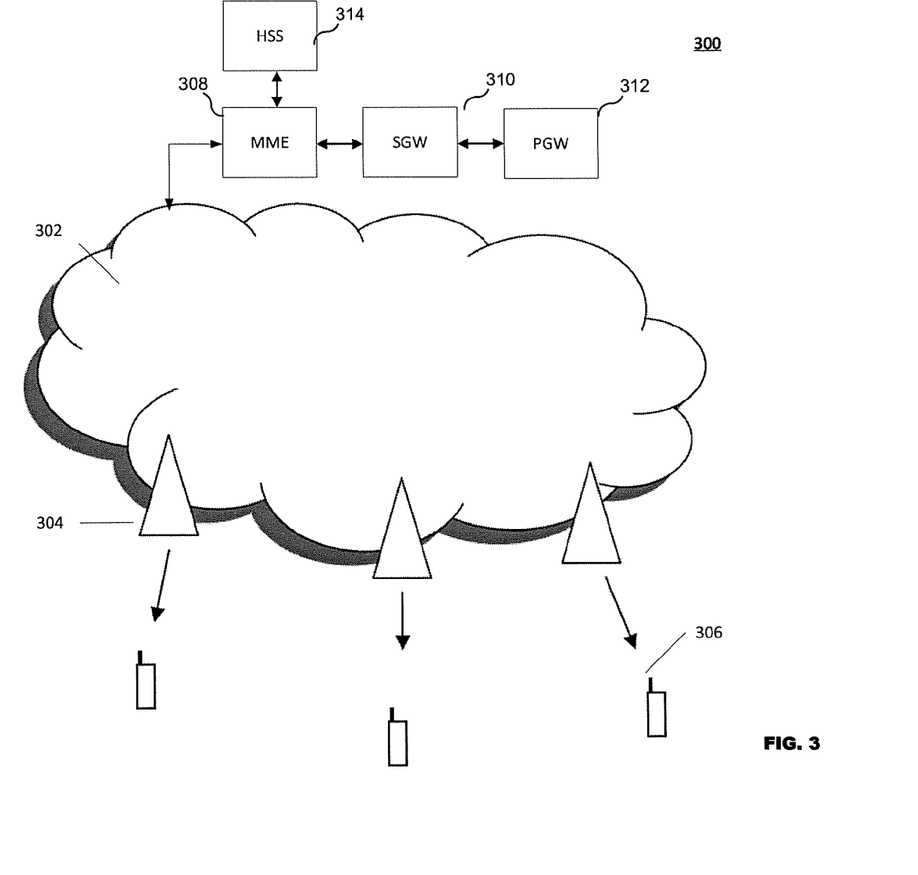
FIG. 3 is an exemplary illustration of a wireless communication topology.

Referring to FIG. 3, a wireless communication deployment 300 in accordance with exemplary embodiments includes an access node 304 serving a wireless communication device (WCD) 306. Examples of WCDs include, but are not limited to, mobile telephones, user equipments (UEs), personal digital assistants, electronic readers, portable electronic tablets, wireless sensors, machine communication devices, personal computers, and laptop computers. Furthermore, the device 306 may be a legacy UE or dynamic TDD capable UE. Access node 304 may be, for example, a base station, an eNodeB, relay node, or gateway type device, and is capable of communicating with device 306, along with any additional elements suitable to support wireless communication between wireless communication devices or between a wireless communication device and another communication device, such as landline telephone. The access node 304 may be in communication with, for instance via a network 302, an MME 308. The MME 308 may be in communication with both the home subscriber server (HSS) 314 and SGW 310, which is in communication with PGW 312.

3GPP TS 24.301 section 5.2.2 describes a procedure after power on of a UE. First, the UE enters a EMM-DEREGISTERED state. Assuming that the UE has a USIM, the UE enters a PLMN-SEARCH sub-state. The sub-state chosen, after the PLMN-SEARCH following power on, is a NORMAL-SERVICE sub-state if a suitable cell has been found and the PLMN or tracking area is not in a forbidden list. Once the UE is in the NORMAL-SERVICE sub-state, the UE initiates an attach procedure. The UE enters the EMM-REGISTERED state after a successful attach procedure. After a successful attach, the UE is also in an ECM-CONNECTED state (see also 3GPP TS 23.401 section 4.6).

According to some embodiments, a PDN connection may be moved, for example, from the LTE network to the WLAN network when the LTE network is overloaded and there is free capacity in the WLAN network, or when the LTE signal strength gets low, and the WLAN signal strength is high. When the last PDN connection is handed over from LTE to WLAN, the PGW may initiate a procedure "PGW initiated bearer deactivation" in 3GPP TS 23.401 section 5.4.4.1, as illustrated in FIG. 4.

Figure 4:
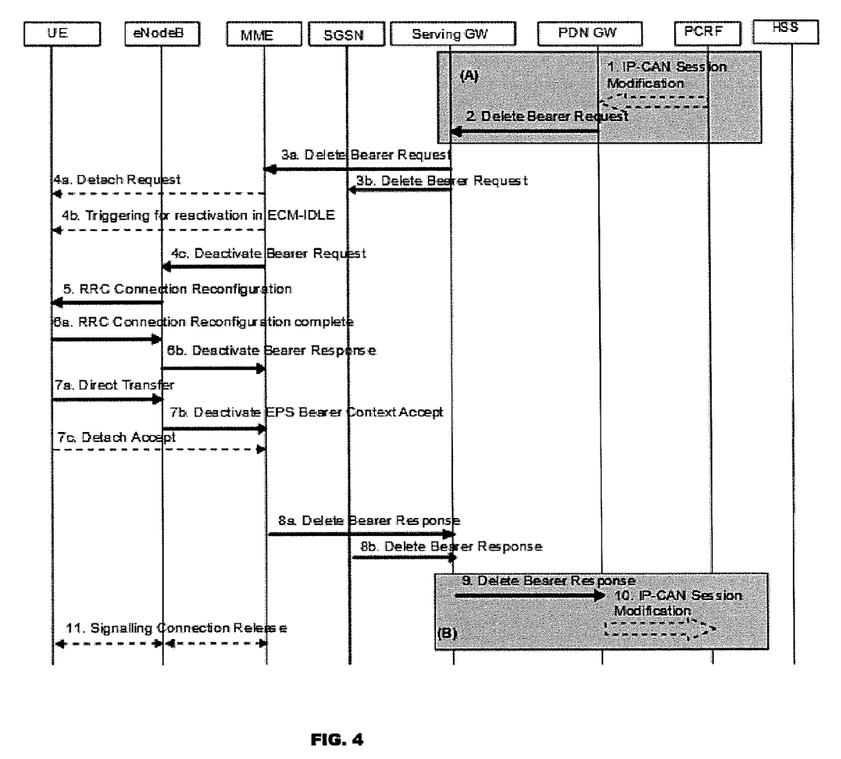
FIGS. 4 and 5 illustrate exemplary sequence diagrams of procedures performed after handover from LTE to WLAN.

As illustrated in FIG. 4, the MME receives a Delete Bearer Request signal (step 3a). Two different scenarios may arise here. In a first scenario, if the UE is in an ECM-IDLE mode, then there is no S1-MME interface set-up between the UE and the MME. Accordingly, in this scenario, the MME performs a local detach for this UE. The MME further demotes the UE state to EMM-DEREGISTERED. Moreover, in this scenario, the steps 4-7 and 11 are not performed. In other words, the UE is not explicitly notified of the detachment.

Figure 5:
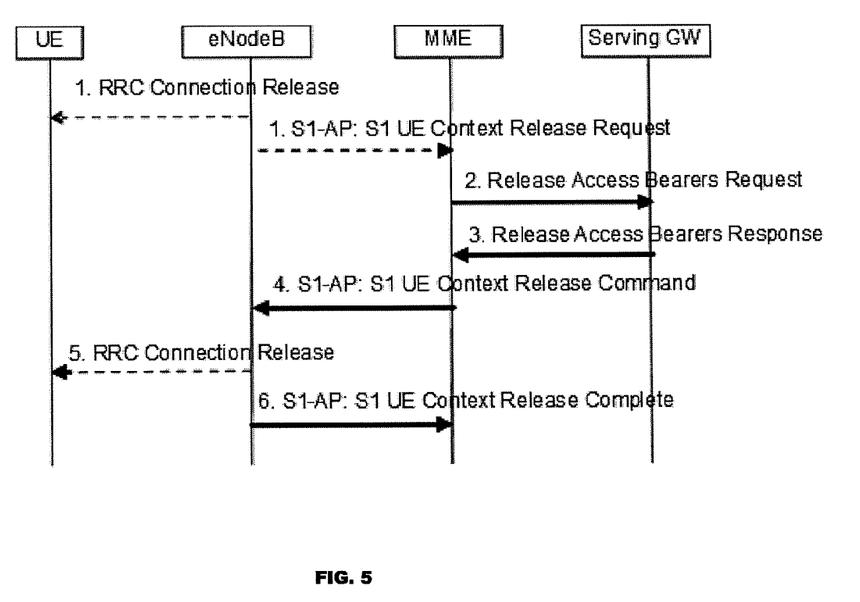

In a second scenario, if the UE is in an ECM-CONNECTED mode, then there is an S1-MME interface set up. In this scenario, the MME may initiate the "S1 release procedure" as described in 3GPP TS 23.401 section 5.3.5 (shown in FIG. 5). As a result, the UE enters the ECM-IDLE mode. The MME locally demotes the UE state to EMM-DEREGISTERED. In FIG. 4, steps 4-7 are not performed. However, in this scenario, step 11 is performed. In FIG. 4, for this scenario, step 5 is performed. In other words, the UE is explicitly notified of the detachment by means of an "RRC Connection Release." Some of steps 4-7 in FIG. 4 may be performed in scenarios where there is handover to a PDN connection to a WLAN while one or more other PDN connections stay on the LTE network. In another scenario, some of steps 4-7 may be performed.

If a UE in the ECM-IDLE mode tries to send traffic over the LTE interface, the UE first needs to do a transition to the ECM-CONNECTED mode. This transition may be performed by a "Service Request" procedure as described in 3GPP TS 23.401 section 5.3.4.1. If the UE was already in a EMM-DEREGISTERED mode in the MME, the network will inform the UE with a cause code "implicitly detached." Similarly, if a UE in the ECM-IDLE mode performs a tracking area update, the UE is informed of this implicit detachment in a fault code. When receiving the "implicitly detached" fault code, the UE enters the EMM-DEREGISTERED state with NORMAL-SERVICE sub-state (see 3GPP TS 24.301). From here, the procedure is similar to the one after power on (i.e., the UE initiates an attach procedure to the LTE network.)

After handover from LTE to WLAN, the UE may either power off the LTE side, or immediately tries to reattach to the LTE network. Totally powering off the LTE side is not preferred since RAN steering via the LTE network would be stopped. However, trying to reattach immediately is not preferred either since this would constitute a conventional dummy PDN connection.

According to some embodiments, an "ATTACH-CONDITIONALLY" state is introduced in the UE. This state may be a sub-state of the EMM-DEREGISTERED state and is entered, in some embodiments, when the last PDN connection is handed over to any non-3GPP access such as a WLAN. The PDN connection may handed over to any non-3GPP access known to one of ordinary skill in the art. Entering this state may be performed either implicitly (i.e., when the UE detects that all of the UE's PDN connections are shifted to the WLAN), or a cause value (i.e., field) may be specified in a RRC Release message that indicates to the UE to enter this sub-state. See 3GPP TS 36.331 for a detailed definition of the RRC Connection Release message. In some embodiments, once in the ATTACH-CONDITIONALLY sub-state, the UE initiates an attachment to the LTE network only if certain conditions are fulfilled.

In some embodiments, when the UE is in the EMM-DEREGISTERED.ATTACH-CONDITIONALLY state, the UE listens to broadcast transmissions (i.e., information) from eNB(s) serving the PLMN that the UE was connected to while still on the LTE network. From these broadcast transmissions, the UE extracts broadcast data. The broadcast data may include, but is not limited to, a signal level of the LTE, a load level of the LTE, and condition thresholds. The condition thresholds may be added to the SystemInformationBlockType1 in 3GPP TS 36.331. In some embodiments, the signal levels included in the broadcast transmissions are measured by the UE. In some embodiments, while in the conditional state and connected to the WLAN, the UE measures a signal level of the WLAN and a load level of the WLAN. The load level refers to an amount of traffic on a respective network. Furthermore, the load level may refer to a load on an air interface. Furthermore, load level may refer to a load on a backhaul of a network (e.g., network behind an access point (AP)). Some Aps broadcast this network load level. Sometimes, the air interface is not overloaded but the backhaul is overloaded.

According to some embodiments, the UE applies the extracted broadcast data to a predefined rule. As an example, a predefined rule may specify that if a first value>second value, then reattach to the LTE network. Here, as an example, the first value may be a signal level of the LTE network that is measured by the UE (e.g., 10 dBm), and the second value may be a condition threshold (e.g., 5 dBm) that is included in the broadcast data or is a predetermined value known to the UE. The broadcast data may include a Reference Signal Received Power (RSRP) threshold, a Received Signal Strength Indicator (RSSI) threshold, WLAN load threshold, or any other threshold used as the second value in the predetermined rule. In some embodiments, the condition thresholds applied as the second value in a predetermined rule may be included in an explicit message (e.g., RRC Connection Release Message) from the LTE network that causes the UE to enter the conditional state.

If the conditions for the predefined conditional attachment rules are fulfilled, the UE reattaches to the LTE network. That is, the UE moves to the EMM-DEREGISTERED.NORMAL-SERVICE state. Otherwise, the UE stays in the EMM-DEREGISTERED.ATTACH-CONDITIONALLY state. Furthermore, in some embodiments, if the conditional attachment rules are fulfilled, and there is a valid cell to which to connect, the UE moves to EMM-DEREGISTERED.NORMAL-SERVICE.

According to some embodiments, the UE continuously checks whether the conditions for reattachment to the LTE network are fulfilled. As an example, the UE continuously monitors the broadcast transmissions, extracts the broadcast data included in the broadcast transmissions, and applies the extracted broadcast data to the predefined rules.

In some embodiments, a timer is configured to specify the duration between two consecutive checks of whether the conditions for reattachment to the LTE network are fulfilled. The value of the timer (e.g., count down value) may be fixed or variable. For example, a back off mechanism may be employed where the timer value is scaled up each time the conditions for the predefined rules are not met. In another example, the timer value is scaled depending on how far the measured values are from the threshold values. For example, if an RSRP threshold to re-attach to 3GPP is X, and the measured value is half of that (i.e., 0.5X), the timer value is scaled up by a factor of 2. In another example, if the measured value is ¼th of the threshold value, the timer value is scaled up by a factor of 4. As another example, if the WLAN threshold to reattach to the LTE network is Y, and the measured WLAN value is double of that (i.e., 2Y), the timer value is also doubled, and if it's 3 times the WLAN thresholds, the timer value is tripled, etc. Additionally, the scaling of the timer value may be performed in accordance with multiple thresholds at the same time (e.g., RSRP threshold and RCPI threshold as compared with the respective measured values).

In some embodiments, when the UE's WLAN interface, for any reason, is terminated (e.g., the network disconnects the UE from the WLAN, or the WLAN interface is switched off), then the UE moves to EMM-DEREGISTERED.NORMAL-SERVICE if a cell with a valid PLMN is available at that time, even if the conditions for the reattachment that are based on the 3GPP LTE network are not met. When the UE is in the DEREGISTERED.NORMAL-SERVICE state, the UE follows normal procedures for reattaching to the LTE network.

In some embodiments, a UE may be configured with one or multiple rules. These rules may be preconfigured on the UE or sent to the UE by the network. These rules may be periodically evaluated and may contain zero, one, or multiple thresholds. An example of a rule with zero thresholds is "Ten minutes have elapsed." Examples of a rule with one threshold is "WLAN signal strength<x" or "LTE signal strength>x." Other examples include, but are not limited to: "IF WLAN signal level<x;" "IF LTE signal level>y;" "IF WLAN signal level<x OR LTE signal level>y;" "IF WLAN signal level<x AND LTE signal level>y;" "IF WLAN signal level<x OR WLAN load>y;" etc. One of ordinary skill in the art may create any desired rule as a condition for reattaching to the network.

The threshold values broadcasted from the eNB are not UE-specific. That is, all the UEs listening for the broadcast receive the same broadcasts. Thresholds on a per-UE granularity would require the UE to get authenticated, which is part of the attach procedure.

In some embodiments, all UEs that are in the EMM-DEREGISTERED.ATTACH-CONDITIONALLY and in the same cell, will listen to the same broadcast information and will apply the same rules. Once the attachment conditions are fulfilled, all these UEs will simultaneously perform an attach procedure. This behavior can be optimized by sending additional information to the UE in the detachment signaling.

According to some embodiments, the UE is provided with one or more scaling factors that are applied to the conditional attachment thresholds. For example, assume a scaling factor of ½ is provided to a UE and corresponds with the threshold associated with the 3GPP signal level, and the broadcasted threshold level for reattaching to 3GPP is X. While UEs in the EMM-DEREGISTERED.ATTACH-CONDITIONALLY state that were not provided with a scaling factor will not try to reattach to the LTE network when the 3GPP signal level is below X, the UEs that were provided with the scaling factor will try to reattach to the LTE network when the 3GPP signal level is above 0.5*X. In some embodiments, a scaling factor may be configured for each broadcasted threshold (e.g., one scaling factor for 3GPP signal level, one scaling factor for WLAN signal level, one scaling factor for WLAN load level, etc.).

In some embodiments, the scaling factor is added to the RRC Connection Release message. It is noted that when the UE is in IDLE mode and outside LTE coverage when it performs the handover to WLAN, the UE does not receive the RRC Connection Release message.

According to some embodiments, the scaling factor is set in accordance with a load level of the UE on the LTE network. As an example, the scaling factor is set to force UEs with high traffic to stay in the WLAN for as long as possible when the 3GPP LTE network is overloaded. In some embodiments, the scaling factor is applied randomly to the UEs to prevent attach-detach ping pongs. An attach-detach ping-pong refers to a scenario where a UE that attaches to a second access immediately goes back to reattach to the first access. As an example, a rule may specify "return to the LTE network when WLAN load>x". If some UEs move to the WLAN, a situation may occur where their combined load goes above x, with the result that all UEs would immediately return to the LTE network. A random scaling factor would introduce some differentiation, which helps alleviate this ping-pong effect.

In some embodiments, the scaling factor is determined in accordance to a UE type. As an example, LTE has features that are better than WLAN (e.g., support for quality of service. An operator may want to prefer "gold" level users returning to the LTE earlier than ordinary users.

According to some embodiments, the scaling factors are set based on a subscription level of a UE. For example, a UE's subscription profile may specify the UE as a gold customer (i.e., preferred or priority customer) or a bronze customer (i.e., basic subscription service). Accordingly, the scaling factors may be set to differentiate between these subscription levels, where for example, a gold customer can be provided with a scaling factor to make him/her come back to the more reliable 3GPP LTE network earlier than a bronze customer.

In some embodiments, the network node determines the scaling factor when the UE is attached to the LTE network. For example, when the UE attaches to the LTE network, the network node retrieves the UE's subscription profile or UE type, or monitors the UEs load level on the LTE network.

Figure 6:
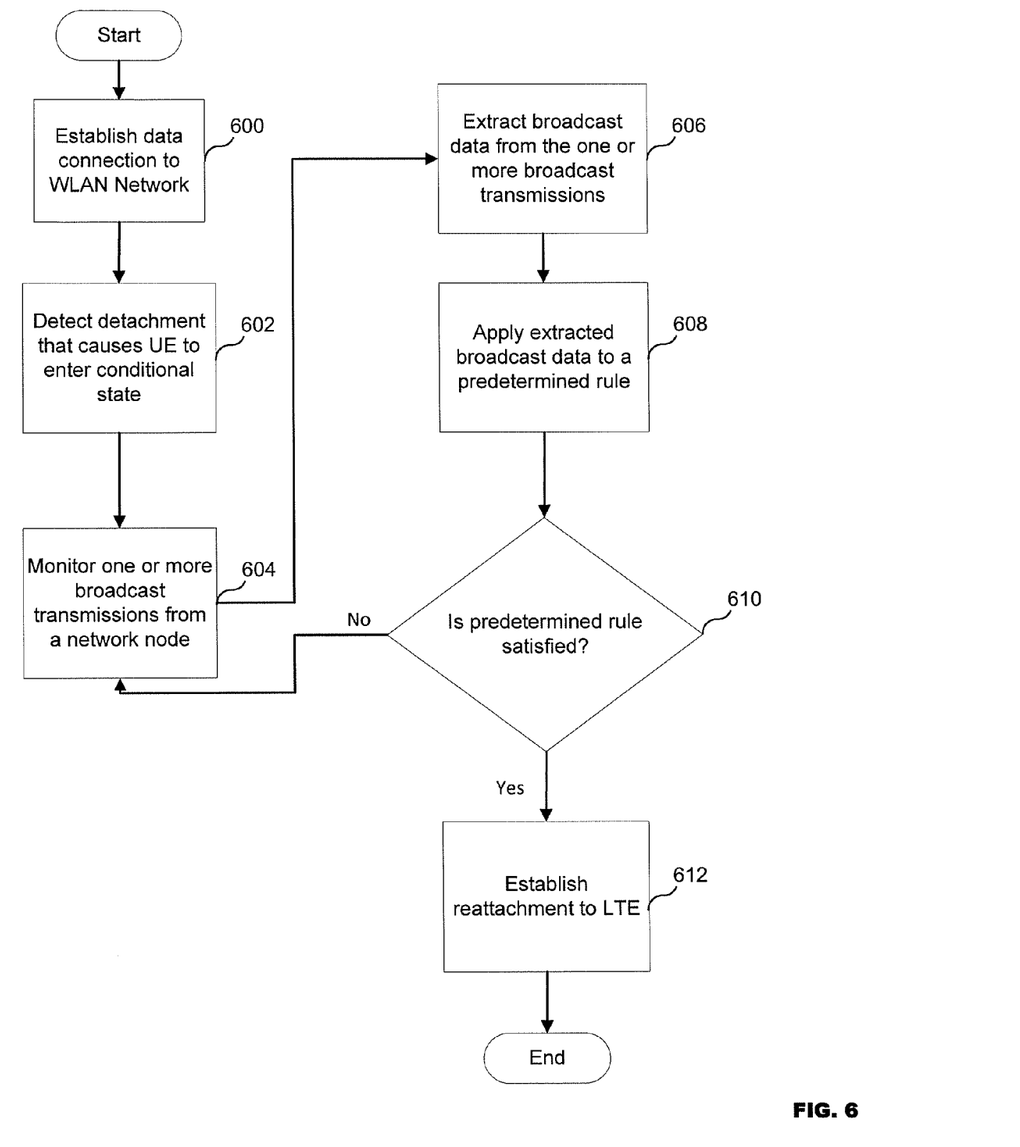
FIG. 6 illustrates and exemplary flow chart of a process performed by a UE.

FIG. 6 illustrates a flow chart of an embodiment of a process performed by the UE. The process may start at step 600 where the UE establishes a data connection to a WLAN Network. The process proceeds to step 602 where the UE detects detachment from the LTE network that cause the UE to enter the conditional state (e.g., detect that all connections removed from LTE network or receive explicit message). When the UE detects detachment based on an explicit message from the LTE network that indicates the conditional state, the explicit message may include one or more condition thresholds that is used in a predetermined rule.

The process proceeds to step 604 where the UE monitors one or more broadcast transmissions from a network node. The process proceeds to step 606 where the UE extracts broadcast data from the one or more broadcast transmissions. The process proceeds to step 608 where the UE applies the extracted broadcast data to a predetermined rule 608. Steps 604-608 may be performed continuously or at the expiration of a timer as discussed above. Additionally, in step 608, one or more scaling factors may be applied to the predetermined rule as described above.

The process proceeds to step 610 to determine if the predetermined rule is satisfied. If the predetermined rule is satisfied, the process proceeds to step 612 to establish a reattachment to the LTE network. If, the predetermined rule is not satisfied, the process returns to step 604.

Figure 7:
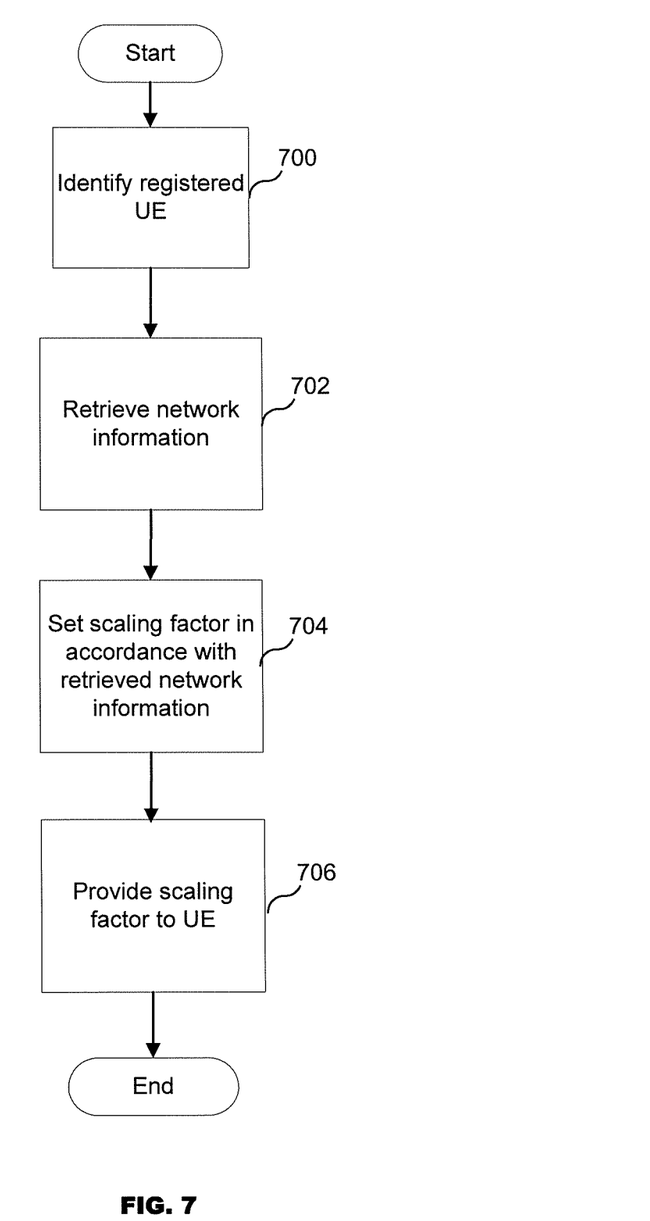
FIG. 7 illustrates and exemplary flow chart of a process performed by a network node.

FIG. 7 illustrates an embodiment of a process performed in a network node. The process may generally start at 700 where the network node identifies a UE registered on a LTE network managed by the network node. The process proceeds to step 702 where the network node retrieves network information. The process proceeds to step 704 where the network node sets a scaling factor in accordance with the retrieved network information. The process proceeds to step 706 where the network node provides the scaling factor to the UE.

Figure 8:
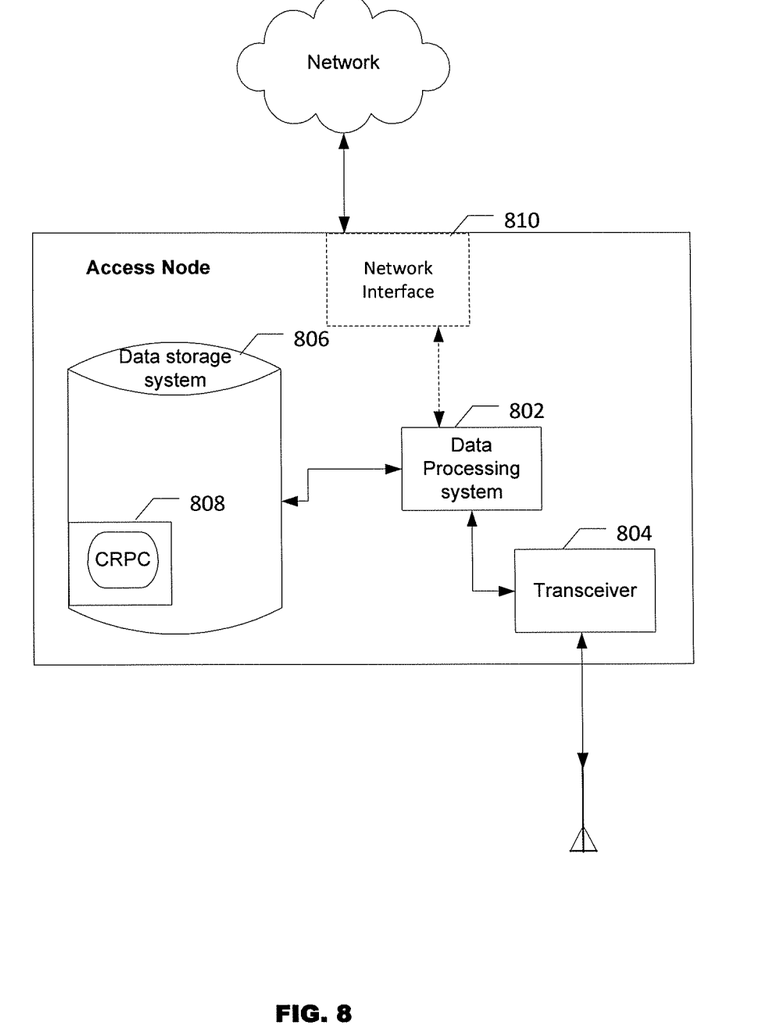
FIG. 8 illustrates an exemplary access node

FIG. 8 illustrates a block diagram of an exemplary access node, such as node 304 shown in FIG. 3. As shown in FIG. 8, the access node 304 may include: a data processing system 802, which may include one or more microprocessors and/or one or more circuits, such as an application specific integrated circuit (ASIC), field-programmable gate arrays (FPGAs), and the like; a network interface 810; a transceiver 804, and a data storage system 806, which may include one or more non-volatile storage devices and/or one or more volatile storage devices (e.g., random access memory (RAM)). According to some embodiments, the data processing system 802 may comprise a control unit used for selection of transmission parameters.

Figure 9:
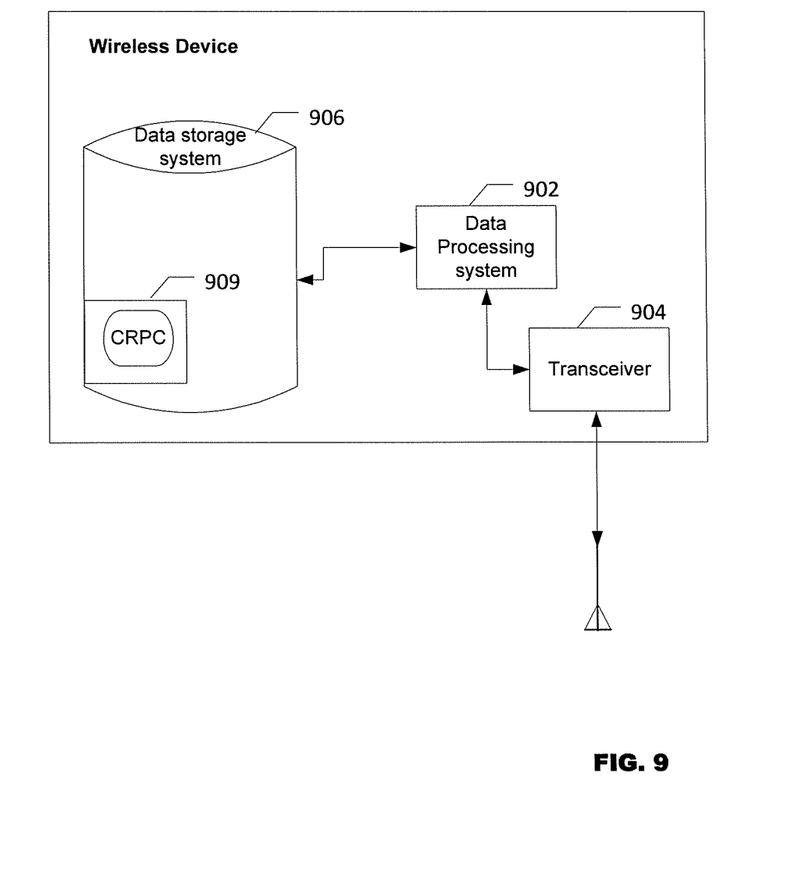
FIG. 9 illustrates an exemplary wireless device.

FIG. 9 illustrates a block diagram of an exemplary wireless device, such as device 306 shown in FIG. 3. As shown in FIG. 9, the device 306 may include: a data processing system 902, which may include one or more microprocessors and/or one or more circuits, such as an application specific integrated circuit (ASIC), field-programmable gate arrays (FPGAs), and the like; a transceiver 904, and a data storage system 906, which may include one or more non-volatile storage devices and/or one or more volatile storage devices (e.g., random access memory (RAM)). According to some embodiments, the data processing system 902 may comprise a control unit used for selection of transmission parameters.

In embodiments, where data processing system 902 includes a microprocessor, computer readable program code (CRPC) 908 may be stored in a computer readable medium, such as, but not limited, to magnetic media (e.g., a hard disk), optical media (e.g., a DVD), memory devices (e.g., random access memory), and the like. In some embodiments, computer readable program code is configured such that when executed by a processor, the code causes the data processing system 902 to perform steps described above (e.g., steps described above with reference to the flow charts shown in FIG. 6). In other embodiments, the device 306 is configured to perform steps described herein without the need for code. That is, for example, data processing system 902 may consist merely of one or more ASICs. Hence, the features of the embodiments described herein may be implemented in hardware and/or software. For example, in particular embodiments, the functional components of the base station described above may be implemented by data processing system 902 executing computer instructions, by data processing system 902 operating independent of any computer instructions, or by any suitable combination of hardware and/or software.

Figure 10:
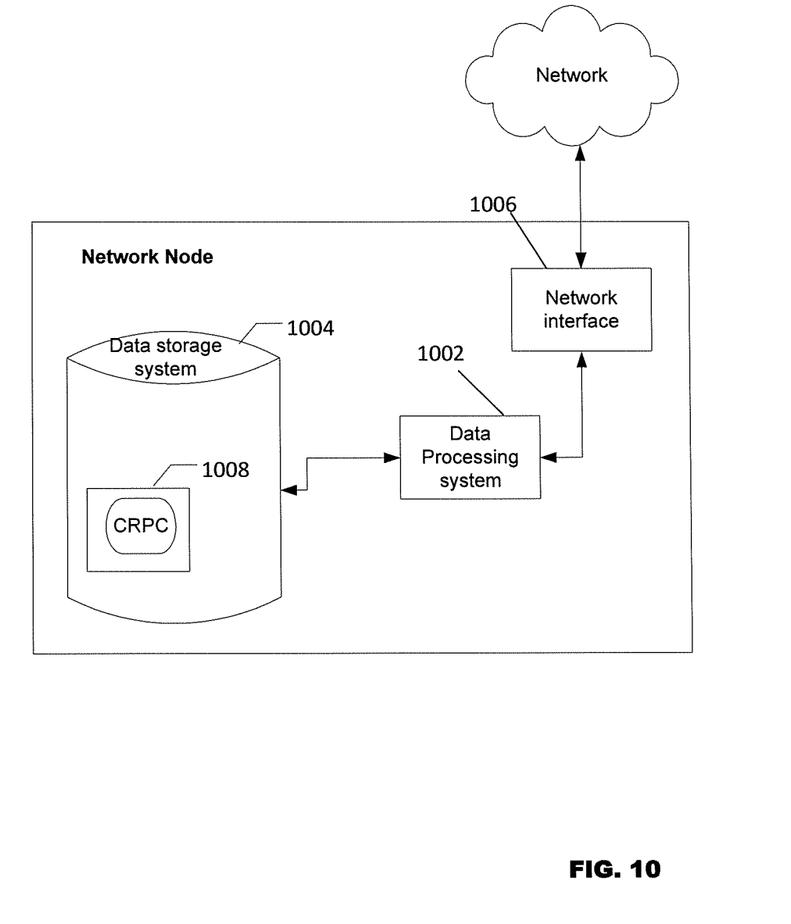
FIG. 10 illustrates an exemplary network node.

FIG. 10 illustrates a block diagram of network node such as MME 308 shown in FIG. 3. As shown in FIG. 10, the network node may include: a data processing system 1002, which may include one or more microprocessors and/or one or more circuits, such as an application specific integrated circuit (ASIC), field-programmable gate arrays (FPGAs), and the like; a network interface 1006, and a data storage system 1004, which may include one or more non-volatile storage devices and/or one or more volatile storage devices (e.g., random access memory (RAM)). According to some embodiments, the data processing system 1002 may comprise a control unit used for selection of transmission parameters.

In embodiments where data processing system 1002 includes a microprocessor, computer readable program code (CRPC) 1008 may be stored in a computer readable medium, such as, but not limited, to magnetic media (e.g., a hard disk), optical media (e.g., a DVD), memory devices (e.g., random access memory), and the like. In some embodiments, computer readable program code is configured such that when executed by a processor, the code causes the data processing system 1002 to perform steps described above (e.g., steps described above with reference to the flow charts shown in FIG. 7). In other embodiments, the MME 308 is configured to perform steps described herein without the need for code. That is, for example, data processing system 1002 may consist merely of one or more ASICs. Hence, the features of the embodiments described herein may be implemented in hardware and/or software. For example, in particular embodiments, the functional components of the base station described above may be implemented by data processing system 1002 executing computer instructions, by data processing system 1002 operating independent of any computer instructions, or by any suitable combination of hardware and/or software.

Advantages of the embodiments described herein include that a RAN keeps a certain control of the UE even though the UE has left (i.e., detached from) the LTE network, which is achieved without requiring LTE network resources.

Abbreviations

3GPP Third Generation Partnership Project
ANDSF Access Network Discovery and Selection Function
AP Access Point
APN Access Point Name
eNB eNodeB
EPC Evolved Packet Core
EPS Evolved Packet System
ETWS Earthquake and Tsunami Warning System
E-UTRAN Evolved Universal Terrestrial Radio Access Network
GTP GPRS Tunneling Protocol
GW Gateway
LTE Long Term Evolution
MME Mobile Management Entity
PDN Packet Data Network
PWS Public Warning System
QoS Quality of Service
RAN Radio Access Network
RCPI Received Channel Power Indicator
RNC Radio Network Controller
RRC Radio Resource Control
RSRP Reference Signal Received Power
RSSI Received Signal Strength Indicator
TDD Time Division Duplex
UE User Equipment
WLAN Wireless Local Area Network Although terminology from 3GPP HSPA has been used in this disclosure to exemplify the exemplary embodiments, one of ordinary skill in the art would understand this as not limiting the scope of the present embodiments to only the aforementioned system. Other wireless systems, including LTE, LTE-A, WiMax, UMB and GSM, may also benefit from exploiting the ideas covered within this disclosure.

Furthermore, the terminology such as NodeB and UE are non-limiting and does in particular do not imply a certain hierarchical relation between the two; in general "NodeB" could be considered as device 1 and "UE" device 2, and these two devices communicate with each other over some radio channel.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that, although the terms first, second, third, etc. may be used herein to describe various elements/ operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or non-transitory computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

The invention claimed is:

1. A method implemented in a user equipment (UE) for establishing reattachment to a first network, the method comprising:
   establishing a data connection to a second network while the UE maintains at least one data connection to the first network;
   detecting a detachment from the first network after establishing the data connection to the second network;
   entering a conditional state after detecting the detachment from the first network, the detachment being detected after a reception of an explicit message from the first network indicating the conditional state;
   after entering the conditional state:
   (i) monitoring one or more broadcast transmissions from a network node;
   (ii) extracting broadcast data included in the broadcast transmissions of the first network;
   (iii) applying the extracted broadcast data in a predetermined rule;
   (iv) determining whether the predetermined rule is satisfied; and
   in response to determining that the predetermined rule is satisfied, establishing the reattachment to the first network,
   wherein the explicit message specifies a scaling factor set in accordance with a load contribution of the UE on the first network, and a condition threshold associated with the predetermined rule is scaled in accordance with the scaling factor.

2. The method according to claim 1, wherein the predetermined rule includes one or more subrules.

3. The method according to claim 2, wherein each subrule includes at least a first value, a second value, and a rule condition.

4. The method according to claim 3, wherein the first value is compared to the second value in accordance with the condition to determine if the predetermined rule is satisfied.

5. The method according to claim 4, wherein
   the first value is (i) a signal level of the first network included in the extracted broadcast data and measured by the UE, (ii) a signal level of the second network measured by the UE, (iii) a load level of the first network, (iv) a load level of the second network, or (iv) a predetermined value, the second value is the condition threshold, wherein the condition threshold is included in the extracted broadcast data, or is included in the explicit message from the first network indicating the conditional state, and the condition specifies one of (i) equal to, (ii) greater than, (iii) greater than or equal to, (iv) less than, and (v) less than or equal to.

6. The method according to claim 4, wherein the first value is an amount of time that has elapsed since the UE entered the conditional state, the second value is a predetermined value, and the predetermined rule is satisfied if the first value is greater than or equal to the second value.

7. The method according to claim 1, wherein the explicit message is a field included in a RRC Connection Release message.

8. The method according to claim 1, wherein the network node is a base station.

9. The method according to claim 1, wherein the UE continuously monitors the one or more broadcast transmissions, extracts the broadcast data, and applies the broadcast data to the predetermined rule.

10. The method according to claim 3, further comprising:
setting a count down value of a timer after entering the conditional state, wherein the monitoring step is performed at the expiration of the count down value.

11. The method according to claim 10, further comprising:
after determining that the predetermined rule is not satisfied, determining a difference between the first value and the second value; and
scaling the count down value in accordance with determined difference; and monitoring one or more broadcast transmissions from the network node after expiration of the scaled count down value of the timer.

12. The method of claim 1, wherein the first network is a Third Generation Partnership Project (3GPP) Long Term Evolution (LTE) network and the second network is a Wireless Local Area Network (WLAN).

13. A user equipment (UE) for establishing reattachment to a first network, the UE comprising:
a processor; and
a memory coupled to the processor,
wherein the processor is configured to:
establish a data connection to a second network while the UE maintains at least one data connection to the first network,
detect a detachment from the first network after the data connection to the second network is established,
enter a conditional state after detecting the detachment from the first network, the detachment being detected after a reception of an explicit message from the first network indicating the conditional state,
after entering the conditional state:
(i) monitor one or more broadcast transmissions from a network node,
(ii) extract broadcast data included in the broadcast transmissions of the first network,
(iii) apply the extracted broadcast data in a predetermined rule,
(iv) determining whether the predetermined rule is satisfied, and
(v) in response to determining that the predetermined rule is satisfied, establish the reattachment to the first network,
wherein the explicit message specifies a scaling factor set in accordance with a load contribution of the UE on the first network, and a condition threshold associated with the predetermined rule is scaled in accordance with the scaling factor.

14. The UE according to claim 13, wherein the predetermined rule includes one or more subrules.

15. The UE according to claim 14, wherein each subrule includes at least a first value, a second value, and a rule condition.

16. The UE according to claim 15, wherein the first value is compared to the second value in accordance with the condition to determine if the predetermined rule is satisfied.

17. The UE according to claim 16, wherein
the first value is (i) a signal level of the first network included in the extracted broadcast data and measured by the UE, (ii) a signal level of the second network measured by the UE, (iii) a load level of the first network, (iv) a load level of the second network, or (iv) a predetermined value,
the second value is the condition threshold, wherein the condition threshold included in the extracted broadcast data, or is included in the explicit message from the first network indicating the conditional state, and
the condition specifies one of (i) equal to, (ii) greater than, (iii) greater than or equal to, (iv) less than, and (v) less than or equal to.

18. The UE according to claim 16, wherein the first value is an amount of time that has elapsed since the UE entered the conditional state, the second value is a predetermined value, and the predetermined rule is satisfied if the first value is greater than or equal to the second value.

19. The UE according to claim 13, wherein the explicit message is a field included in a RRC Connection Release message.

20. The UE according to claim 13, wherein the broadcast transmissions are broadcasted from a base station.

21. The UE according to claim 13, wherein the UE continuously monitors the one or more broadcast transmissions, extracts the broadcast data, and applies the broadcast data to the predetermined rule.

22. The UE according to claim 13, wherein the processor is further configured to:
set a count down value of a timer after entering the conditional state, wherein
the processor is configured to monitor the one or more broadcast transmissions at the expiration of the count down value.

23. The UE according to claim 22, wherein the processor is further configured to:
after determining that the predetermined rule is not satisfied, determine a difference between the first value and the second value,
scale the count down value in accordance with determined difference, and
monitor one or more broadcast transmissions from the network node after expiration of the scaled count down value of the timer.

24. The UE according to claim 13, wherein the first network is a Third Generation Partnership Project (3GPP) Long Term Evolution (LTE) network and the second network is a Wireless Local Area Network (WLAN).

25. The method of claim 1, wherein the UE is connected to the first network while establishing the data connection to the second network.

26. The method of claim 4, wherein
- the first value is (i) a signal level of the second network measured by the UE, (ii) a load level of the first network, or a (iii) a load level of the second network,
- the second value is (i) a condition threshold included in the extracted broadcast data, or (ii) a condition threshold included in an explicit message from the first network indicating the conditional state, and
- the condition specifies one of (i) equal to, (ii) greater than, (iii) greater than or equal to, (iv) less than, and (v) less than or equal to.

27. The method according to claim 1, wherein the scaling factor increases the condition threshold in response to a determination that the load level of the UE exceeds a high traffic threshold.

28. The method according to claim 1, wherein the conditional state is a subs-state of the EMM-DEREGISTERED state.

* * * * *